United States Patent
Razzell et al.

(10) Patent No.: US 12,059,846 B2
(45) Date of Patent: Aug. 13, 2024

(54) 3D GEOMETRY GENERATION FOR COMPUTER AIDED DESIGN CONSIDERING SUBTRACTIVE MANUFACTURING FORCES

(71) Applicant: Autodesk, Inc., San Francisco, CA (US)

(72) Inventors: Martin Raymond Razzell, Keyworth (GB); Luke Edwards, Birmingham (GB); Nathan David Rogers, Rugeley (GB); Hooman Shayani, Chatham (GB)

(73) Assignee: Autodesk, Inc., San Francisco, CA (US)

( * ) Notice: Subject to any disclaimer, the term of this patent is extended or adjusted under 35 U.S.C. 154(b) by 341 days.

(21) Appl. No.: 17/548,165

(22) Filed: Dec. 10, 2021

(65) Prior Publication Data
US 2022/0156434 A1 May 19, 2022

Related U.S. Application Data

(63) Continuation of application No. 16/279,765, filed on Feb. 19, 2019, now Pat. No. 11,200,355.

(51) Int. Cl.
*G06F 30/20* (2020.01)
*B22F 10/20* (2021.01)
(Continued)

(52) U.S. Cl.
CPC .......... *B29C 64/393* (2017.08); *B22F 10/66* (2021.01); *B22F 10/80* (2021.01); *B33Y 50/02* (2014.12);
(Continued)

(58) Field of Classification Search
CPC ....... B29C 64/393; B29C 64/40; B22F 10/66; B22F 10/80; B22F 10/28; B22F 10/38;
(Continued)

(56) References Cited

U.S. PATENT DOCUMENTS 10,192,023 B2  1/2019  Byers et al.
10,915,680 B2  2/2021  Pedersen et al.
(Continued)

FOREIGN PATENT DOCUMENTS

EP   2778992 A1   9/2014

OTHER PUBLICATIONS

Albert, "Generative Design Generates New Interest in a Range of Manufacturing Options," (Feb. 1, 2019) [online] (retrieved from https://www.mmsonline.com/articles/generative-design-generates-new-interest-in-a-range-of-manufacturing-options), 9 pages.
(Continued)

*Primary Examiner* — Charles R Kasenge
(74) *Attorney, Agent, or Firm* — Fish & Richardson P.C.

(57) ABSTRACT

Methods, systems, and apparatus, including medium-encoded computer program products, for computer aided design and manufacture of physical structures include, in at least one aspect, a method including: obtaining a design space for a modeled object, load cases for physical simulation, and design criteria, wherein the modeled object includes specified geometry with which generatively designed geometry will connect, and wherein the load cases include at least one in-use load case for the physical structure and at least one subtractive-manufacturing load case associated with the specified geometry and with a subtractive manufacturing system; producing the generatively designed geometry in the design space for the modelled object in accordance with the load cases for physical simulation of the modelled object and the design criteria for the modeled object; and providing the modeled object with the generatively designed geometry for use in manufacturing the physical structure.

36 Claims, 7 Drawing Sheets

(51) Int. Cl.
  B22F 10/66    (2021.01)
  B22F 10/80    (2021.01)
  B29C 64/393   (2017.01)
  B33Y 50/02    (2015.01)
  G06T 17/00    (2006.01)
  B22F 10/28    (2021.01)
  B22F 10/38    (2021.01)
  B22F 10/40    (2021.01)
(52) U.S. Cl.
  CPC .............. *G06F 30/20* (2020.01); *G06T 17/00* (2013.01); *B22F 10/28* (2021.01); *B22F 10/38* (2021.01); *B22F 10/40* (2021.01)
(58) Field of Classification Search
  CPC ......... B22F 10/40; B33Y 50/02; B33Y 40/20; B33Y 40/00; G06F 30/20; G06F 2119/14; G06F 30/17; G06T 17/00; G05B 19/4099; Y02P 10/25; Y02P 90/02
  See application file for complete search history.

(56) References Cited

U.S. PATENT DOCUMENTS

| | | | |
|---|---|---|---|
| 2007/0013724 A1* | 1/2007 | Swift | G06F 30/00 345/660 |
| 2015/0165690 A1 | 6/2015 | Tow | |
| 2016/0091388 A1 | 3/2016 | De Baere | |
| 2016/0374431 A1 | 12/2016 | Tow | |
| 2017/0024493 A1 | 1/2017 | Cheong et al. | |
| 2017/0024511 A1 | 1/2017 | Cheong et al. | |
| 2018/0330029 A1 | 11/2018 | Pedersen et al. | |
| 2018/0345647 A1 | 12/2018 | Morris et al. | |
| 2018/0349531 A1 | 12/2018 | Morris et al. | |
| 2019/0011903 A1 | 1/2019 | Jacobs, II | |
| 2019/0325098 A1* | 10/2019 | Vernon | G06F 30/23 |
| 2020/0098195 A1 | 3/2020 | Jaiswal et al. | |
| 2020/0122403 A1 | 4/2020 | Dhokia et al. | |
| 2020/0150623 A1 | 5/2020 | Bandara et al. | |
| 2020/0151286 A1 | 5/2020 | Willis et al. | |
| 2020/0156323 A1* | 5/2020 | Woytowitz | B33Y 50/02 |
| 2020/0265122 A1 | 8/2020 | Razzell et al. | |

OTHER PUBLICATIONS

Arisoy et al., "Design and Topology Optimization of Lattice Structures Using Deformable Implicit Surfaces for Additive Manufacturing," in ASME 2015 International Design Engineering Technical Conferences and Computers and Information in Engineering Conference (2015) 11 pages.

Brackett et al., "Topology Optimization for Additive Manufacturing," in Proceedings of the Solid Freeform Fabrication Symposium (2011) 15 pages.

Butscher et al., U.S. Appl. No. 62/515,231, "A Subtractive Manufacturing Constraint for Level Set topology Optimization," filed on Jun. 13, 2017, 25 pages.

Dapogny et al., "Geometric Constraints for Shape and Topology Optimization in Architectural Design," Computational Mechanics, Springer-Verlag, 2017, 59(6):933-965. 10.1007/s00466-017-1383-6. hal-01354004v3.

Gibou et al., "A Review of Level-set Methods and Some Recent Applications," Journal of Computational Physics (2018) 353:82-109.

Guest and Zhu, "Casting and Milling Restrictions in Topology Optimization via Projection-based Algorithms," in ASME 2012 International Design Engineering Technical Conferences and Computers and Information in Engineering Conference (2012) 8 pages.

Ikeya and Shimoda, "Multi-objective Free-form Optimization for Shape and Thickness of Shell Structures with Composite Materials," in 11th World Congress on Structural and Multidisciplinary Optimisation (2015) 6 pages.

Joshi et al., "CAD-integrated Topology Optimization (BGCE Honours Project)," Department of Informatics, Technical University of Munich (2016) 77 pages.

Langelaar, "Topology Optimization for Multi-axis Machining," Comput. Methods Appl. Mech. Engrg. (2019) 351:226-252.

Liu and Ma, "A Survey of Manufacturing Oriented Topology Optimization Methods," Advances in Engineering Software (2016) 100:161-175.

Liu et al., "Current and Future Trends in Topology Optimization for Additive Manufacturing," Structural Multidisciplinary Optimization, published online: May 3, 2018, 27 pages, © Springer-Verlag GmbH Germany.

Lu et al., "Build-to-Last: Strength to Weight 3D Printed Objects," ACM Trans. Graph. (2014) 33(4):97:1-97:10.

Nakayama and Shimoda, "Shape-topology Optimization for Designing Shell Structures," in VII European Congress on Computational Methods in Applied Sciences and Engineering (2016) 10 pages.

Sigmund and Maute, "Topology Optimization Approaches—a Comparative Review," Struct. Multidisc. Optim. (2013) 48:1031-1055.

Unknown author, "Topology Optimization R18.0 Feature and Usage Highlights," © 2016 ANSYS, Inc., Mar. 12, 2017, 29 pages.

Van Dijk et al., "Level-set Methods for Structural Topology Optimization: a Review," Struct. Multidisc. Optim. (2013) 48:437-472.

Vatanabe et al., "Topology Optimization with Manufacturing Constraints: a Unified Projection-based Approach," Advances in Engineering Software (2016) 100:97-112.

Xia et al., "A Level Set Based Method for the Optimization of Cast Part," Struct. Multidisc. Optim. (2010) 41:735-747.

* cited by examiner

3D GEOMETRY GENERATION FOR COMPUTER AIDED DESIGN CONSIDERING SUBTRACTIVE MANUFACTURING FORCES

CROSS-REFERENCE TO RELATED APPLICATION

This application is a continuation application of, and claims priority to, U.S. patent application Ser. No. 16/279,765, entitled 3D GEOMETRY GENERATION FOR COMPUTER AIDED DESIGN CONSIDERING SUBTRACTIVE MANUFACTURING FORCES, filed on Feb. 19, 2019, and issuing as U.S. Pat. No. 11,200,355 on Dec. 14, 2021. The disclosure of the foregoing application is incorporated here by reference in its entirety.

BACKGROUND

This specification relates to computer aided design of physical structures, which can be manufactured using subtractive manufacturing systems and techniques in addition to additive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of mesh model geometry, which can be difficult to work with in a CAD program.

Further, CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use).

SUMMARY

This specification describes technologies relating to computer aided design of physical structures using generative design processes, such that manufacturing of the physical structures using subtractive manufacturing systems and techniques (in addition to using additive manufacturing and/or other manufacturing systems and techniques) is facilitated by the design processes.

In general, one or more aspects of the subject matter described in this specification can be embodied in one or more methods, including: obtaining, by a computer aided design program, a design space for a modeled object for which a physical structure will be manufactured in two stages, load cases for physical simulation of the modelled object, and design criteria for the modeled object, wherein the modeled object includes specified geometry with which generatively designed geometry will connect, and wherein the load cases include at least one in-use load case for the physical structure and at least one subtractive-manufacturing load case associated with the specified geometry and with a subtractive manufacturing system usable to manufacture the physical structure in a second of the two stages; producing, by the computer aided design program, the generatively designed geometry in the design space for the modelled object in accordance with the load cases for physical simulation of the modelled object and the design criteria for the modeled object; and providing, by the computer aided design program, the modeled object with the generatively designed geometry for use in manufacturing the physical structure using a first of the two stages, in which a workpiece is built, and the second of the two stages, in which one or more portions of the workpiece are removed using the subtractive manufacturing system, to form the physical structure. These one or more methods, as described herein, can be implemented using systems, apparatus, and medium-encoded computer program products, for computer aided design and manufacture of physical structures.

The obtaining can include: receiving user input identifying the specified geometry; and receiving user input defining the at least one subtractive-manufacturing load case for the specified geometry. The obtaining can include obtaining the at least one subtractive-manufacturing load case for the specified geometry by performing operations including: obtaining fixturing information and toolpath information corresponding to the subtractive manufacturing system, wherein the fixturing information indicates how the workpiece will be supported in the subtractive manufacturing system during at least a portion of the second of the two stages corresponding to machining the specified geometry, and the toolpath information indicates how the workpiece will be machined by the subtractive manufacturing system during the at least a portion of the second of the two stages corresponding to machining the specified geometry; and calculating machining forces to be applied to the workpiece by the subtractive manufacturing system during the at least a portion of the second of the two stages corresponding to machining the specified geometry based on the fixturing information and the toolpath information.

The design criteria can include at least one subtractive manufacturing constraint including a machining tolerance for the specified geometry, obtaining the fixturing information and the toolpath information can include determining one or more tools used with one or more toolpaths by the subtractive manufacturing system to achieve the machining tolerance during the at least a portion of the second of the two stages corresponding to machining the specified geometry, and producing the generatively designed geometry can include excluding generative geometry from a three dimensional space defined by a subtractive manufacturing clearance region around the one or more tools as used with the one or more toolpaths.

The first of the two stages can include an additive manufacturing stage to build the workpiece, and the design criteria can include at least one additive manufacturing design criterion. The providing can include: generating computer-numerical-control instructions for an additive manufacturing system to build the workpiece; and generating computer-numerical-control instructions for the subtractive manufacturing system to remove the one or more portions of the workpiece to form the physical structure.

Producing the generatively designed geometry can include: effecting a generative design process to produce in-use geometry that satisfies the at least one in-use load case for the physical structure; and effecting a generative design process to produce machining-support geometry that satisfies the at least one subtractive-manufacturing load case. Effecting the generative design process to produce the in-use geometry can include excluding production of generative geometry in a three dimensional space defined by a subtractive manufacturing clearance region, and effecting the generative design process to produce the machining-support geometry can include producing the machining-support geometry without regard to a geometry keep out space defined by the design criteria while excluding production of generative geometry in the three dimensional space defined by the subtractive manufacturing clearance region.

The method(s) can include specifying a machining operation to be performed by the subtractive manufacturing system to remove any portion of the machining-support geometry that violates the geometry keep out space. Further, the method(s) can include producing additional geometry usable as a fixture for the workpiece in the subtractive manufacturing system during machining.

Particular embodiments of the subject matter described in this specification can be implemented to realize one or more of the following advantages. Downstream manufacturing processes can be considered earlier in the part design process. A user can be enabled to produce toolpaths (either manually or automatically) on initial geometry of a model before running a generative design engine, and from these toolpaths (or from separate user input) the manufacturing forces to be imparted during subtractive manufacturing can be defined in a force model. The force model can be used in a generative design process to account for the subtractive manufacturing forces at the part design stage. Moreover, the machine tool moves (corresponding to the toolpaths used in the subtractive manufacturing) can be used to constrain where the generative geometry is allowed to be created, thus ensuring that toolpaths will not collide with generated geometry during machining.

In the case of additively manufactured parts, such parts will often require some amount of subtractive manufacturing (e.g., finishing operations in a milling machine) and generatively design parts will likely be an important component of additive manufacturing processes. By taking the machining forces into account during the generative design stage of part modelling, the downstream manufacturing processes can be facilitated. This can result in generatively designed parts that are more readily manufacturable and can save costs during subtractive manufacturing processes.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
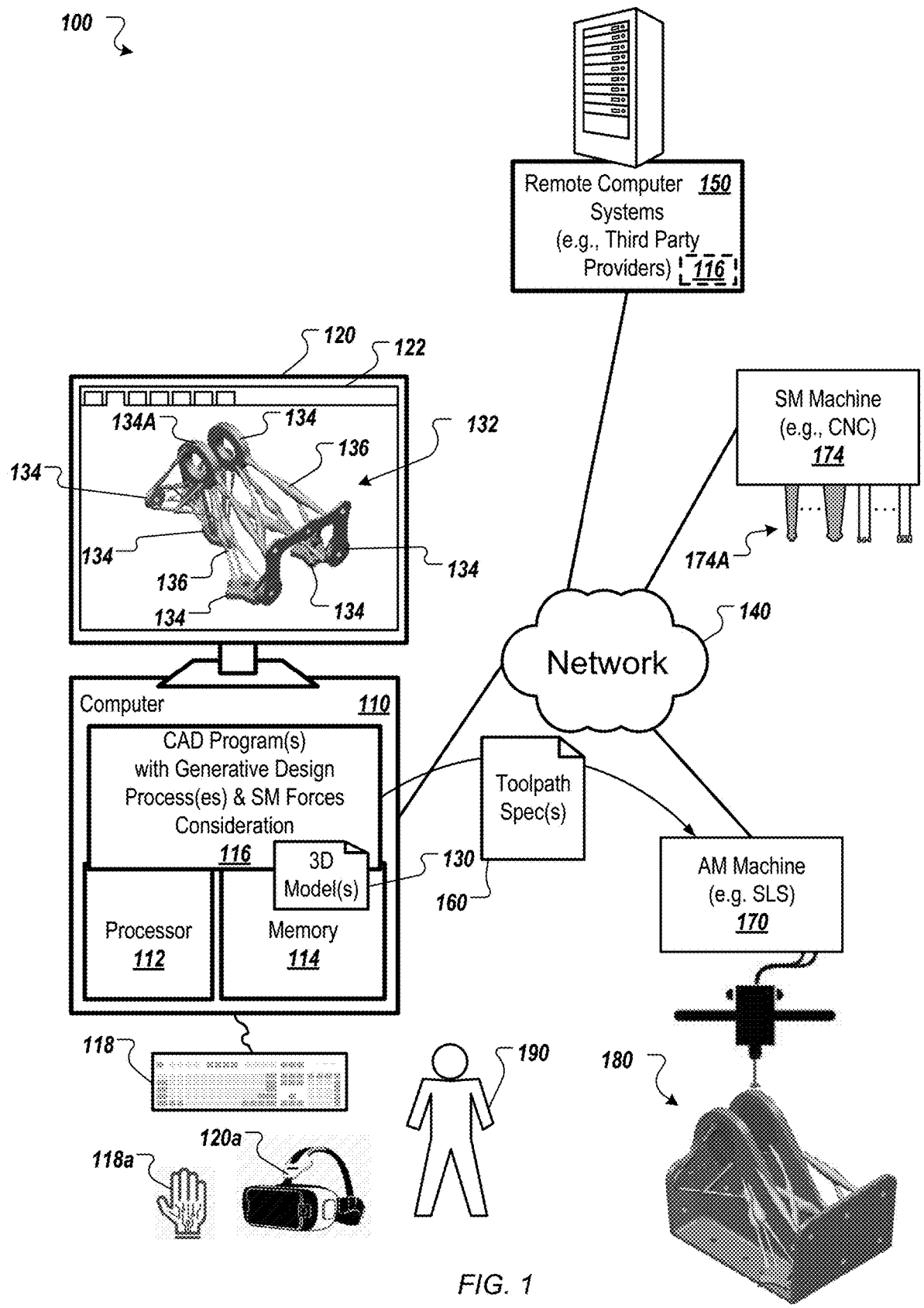
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and one or more generative design processes that take subtractive manufacturing (SM) forces into consideration when producing a generative design. The one or more generative design processes can employ material or microstructure techniques and/or geometrical or macrostructure techniques for generative design and can include Solid Isotropic Material with Penalization (SIMP) and/or level-set methods for topology optimization. Further, the CAD program(s) 116 can implement physical simulation (finite element analysis (FEA) or other) and manufacturing control functions.

As used herein, CAD refers to any suitable program used to design physical structures that meet specified design requirements, regardless of whether or not the program is capable of interfacing with and/or controlling specific manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118*a* and/or a VR/AR headset 120*a*.

As noted above, the CAD program(s) 116 implement 3D modeling functions, which means a 3D model 132 can be built using the CAD program(s) 116. The CAD program(s) 116 implement physical simulation (locally and/or by remote procedure call) to assist in building the 3D model 132. Physical simulations, such as FEA, Computational Fluid Dynamics (CFD), Acoustics/Noise Control, thermal conduction, and/or computational injection molding simulations are often integral components in CAD-based product development. The CAD program(s) 116 can be used to build precise geometric descriptions of the design model, while physical simulations enable improved performance without time consuming physical testing.

The CAD program(s) 116 can provide user interface elements that enable the user to specify inputs for the physical simulation(s), such as materials and loading cases for the 3D model(s) 132, where the loading cases define loads in different directions to be borne by a part being designed during use of the part. Thus, a user 190 can interact with the UI 122 of the CAD program(s) 116, including producing a full mechanical problem definition for a part to be manufactured, so as to build and modify 3D model(s) 132, which can be stored in 3D model document(s) 130. In the example of FIG. 1, the 3D model 132 is of a complex aerospace bracket, but this is merely one of many possible 3D models that can be designed using the systems and techniques described herein.

Moreover, the CAD program(s) 116 implement at least one generative design method (locally and/or by remote procedure call) which enables the CAD program(s) 116 to generate one or more portions of the 3D model(s) 132 automatically (or the entirety of a 3D model) based on design criteria, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources. The design criteria can be defined by the user 190, or by another party and imported into the CAD program(s) 116.

The design criteria can include one or more design objectives and one or more design constraints. Design objectives can include those that minimize one or more cost functions and/or that maximize one or more utility functions for the object to be manufactured. In some implementations, design objectives include one or more of the following: (1) minimizing material usage (e.g., waste material), (2) minimizing weight, (3) minimizing manufacturing time, (4) maximizing tool life, (5) maximizing ability to remove support material, (6) targeting a set natural frequency (e.g., higher/lower natural modes of vibration to achieve vibration damping), and (7) positioning and packing of parts within the structure (e.g., electronic components for circuit actuation, including reserving space for cabling between components in an assembly, limiting cabling length, and/or components for structural health monitoring, as well as assembly considerations to ensure each component can be added/removed independently or with a limited number of steps). Design constraints can include those that address manufacturing requirements and/or that address use requirements. In some implementations, design constraints include one or more of the following: (1) manufacturing constraints that restrict geometries to those that can be manufactured (e.g., minimum self-supporting angle for AM processes in which separate support material will not be used, subject to build direction when appropriate, or mechanical access constraints for AM or SM processes, such as 3-axis, 5-axis and/or 2.5-axis CNC constraints), (2) thermo-mechanical constraints, (3) material fraction or variation constraints, (4) structural integrity, (5) stiffness, (6) compliance, (7) stress criteria (e.g., Von Mises or Tsai-Wu stress for manufacturing or use), (8) physical constraints (non-interference with larger system of parts), and (9) damage constraints (e.g., brittle elastic fraction resistance). In some implementations, the design criteria include minimizing compliance with volume, stress, displacement, buckling safety factor, and/or natural frequency constraints, but the method(s) can be generalized to other design objectives and constraints, including minimizing volume, deviation (e.g., least square deviation) from a target (compliant mechanism), and/or design dependent loads (pressure loads).

Various generative design processes can be used as the at least one generative design method implemented by the CAD program(s) 116. These generative design processes can optimize the shape and topology of at least a portion of the 3D model. The iterative optimization of the geometric design of the 3D model(s) by the CAD program(s) 116 involves topology optimization, which is a method of lightweighting where the optimum distribution of material is determined by minimizing an objective function subject to constraints (e.g., structural compliance with volume as a constraint). Topology optimization can be addressed using a variety of numerical methods, which can be broadly classified into two groups: (1) material or microstructure techniques, and (2) geometrical or macrostructure techniques.

Microstructure techniques are based on determining the optimum distribution of material density and include the SIMP method and the homogenization method. In the SIMP method, intermediate material densities are penalized to favor either having $\rho=0$ or $\rho=1$, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries is optimized during the generative design process, while the topology is changed in the domain as a result of the shape optimization in combination with adding/removing and shrinking/growing/merging the void region(s). Thus, the types of final optimized topologies that can result from a generative design process using a macrostructure technique can depend significantly on the number and sizes of voids within the seed geometry for the process.

In the example of FIG. 1, the 3D model 132 is represented in B-Rep format, but it will be appreciated that the CAD program(s) 116 can produce geometry of various types (e.g., B-Rep, T Spline, subdivision surface, mesh, and/or other computer modelling formats) either in different implementations or in a single implementation. For example, the initial model 132 created in the CAD program(s) 116 can be B-Rep geometry, which is then converted to mesh geometry for use as input to the generative design process, which can produce new mesh geometry that the CAD program(s) 116 then convert to T-Spline and/or B-Rep geometry. Many suitable variations in geometry format can be used in respective implementations.

As shown, the 3D model 132 is of an aerospace bracket, which includes initial input solids 134 in B-Rep format. These represent preserve bodies used as input to the generative design process, i.e., specified geometry with which generatively designed geometry will connect to form the complete 3D model 132. This input geometry specifies boundary conditions for the generative design process, which produces new geometry 136 to form the complete 3D model 132 of the aerospace bracket. In the example shown in the UI 122, the CAD program(s) 116 have only considered in-use load case(s) during the generative design process. Thus, the physical aerospace bracket represented by 3D model 132 will function properly under in-use loading conditions, and while the physical aerospace bracket can be manufactured using an additive manufacturing (AM) machine 170, it may not be possible to complete the manufacturing of the physical aerospace bracket using a subtractive manufacturing (SM) machine 174. For example, input geometry 134A will need to physically interface with another part in a larger system, and this physical interface may thus require SM machining to ensure that the physical interface of geometry 134A is exact to specification and/or that surface finishes are suitable for their intended use. But generative designed geometry 136 may not be strong enough to withstand the forces of such machining, e.g., a lateral force applied to the physical structure correspond to geometry 134A to drill the hole in the center and/or to get that physical structure's surface within a specified tolerance.

To address this issue, the CAD program(s) 116 take into account the planned SM systems and techniques to be used on the part (e.g., expected SM forces) when producing a generatively designed part. This can include the generative design engine taking account of whether the geometry is strong enough to withstand the machining forces and also taking account of the tool movements that will be used when machining the part.

In some implementations, in addition to the user 190 specifying through UI 122 one or more loading cases (e.g., defining loads in different directions) to be borne by a part being designed during use of the part, the UI 122 of the CAD program(s) 116 can enable the user 190 to also specify one or more loading cases (e.g., defining loads in different directions) to be borne by the part being designed during at least one subtractive manufacturing stage of manufacture. Thus, the user 190 can interact with the UI 122 of the CAD program(s) 116 to produce a full mechanical problem definition for a part to be manufactured, where that full mechanical problem definition specifies forces that will be applied to the part during subtractive manufacturing, as well as forces that will act on the part during use. Moreover, in some implementations, the SM loading case(s) are determined semi-automatically or fully automatically, as described in further detail below.

In any case, the CAD program(s) 116 can produce additional geometry in connection with the generative design process to ensure that a physical structure 180 manufactured in a first stage (e.g., an AM stage, as shown) can withstand later machining in a second, SM stage of manufacture. Note that the example shown in FIG. 1 represents additional fixturing geometry added for the aerospace bracket, but in addition to this being but one example of a model 132, this is but one example of additional geometry. Thus, rather than fixturing geometry, as shown, the SM forces considered during the generative design process can cause the generatively designed geometry 136 to be more robust and thus strong enough to withstand the expected SM forces. As will be appreciated in view of the processes described below, various additional geometry can be produced depending on the specific input geometry, the in-use and SM load cases, and the fixturing options resulting from the SM systems and techniques to be used.

In addition, in some implementations, the CAD program(s) 116 implement manufacturing control functions. Once the user 190 is satisfied with a 3D model 132, the 3D model 132 can be stored as the 3D model document(s) 130 and/or used to generate another representation of the model (e.g., an .STL file for additive manufacturing). This can be done upon request by the user 190, or in light of the user's request for another action, such as sending the 3D model 132 to the AM machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to the AM machine 170 to produce the physical structure 180. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In some cases, the AM machine 170 builds the physical structure 180 directly, and in some cases, the AM machine 170 builds a mold for use in casting or forging the physical structure 180. In addition, the user 190 can save or transmit the 3D model 132 for later use. For example, the CAD program(s) 116 can store the document(s) 130 that includes the 3D model 132.

In some implementations, the CAD program(s) 116 implement manufacturing control functions for SM machine(s) 174 (e.g., a Computer Numerical Control (CNC) milling machine, such as a multi-axis, multi-tool milling machine) to be used in the manufacturing process. For example, the CAD program(s) 116 can generate CNC instructions for a machine tool system 174 that includes multiple tools 174A (e.g., solid carbide round tools of different sizes and shapes, and insert tools of different sizes that receive metal inserts to create different cutting surfaces) useable for various machining operations. Thus, in some implementations, the CAD program(s) 116 provide instructions to build a workpiece 180 in a first stage of manufacturing, e.g., using direct AM and/or using forging and/or casting methods, and the CAD program(s) 116 also provide instructions to machine the workpiece 180, e.g., roughing and/or finishing operations, in a second stage of manufacturing, e.g., in a 3-axis CNC milling system in order to form the completed structure. Thus, in some implementations, the CAD program(s) 116 can provide a corresponding document 160 (having toolpath specifications of an appropriate format, e.g., a CNC numerical control (NC) program) to the SM machine 174 for use in manufacturing the part using various cutting tools, etc. In general, various different manufacturing systems and techniques can be employed, either alone or in combination, to produce a final structure, and the CAD program(s) 116 can include suitable algorithms to generate toolpath specifications 160 for one or more of these various systems to manufacture a part that has been designed using the systems and techniques described in this application.

Figure 2:
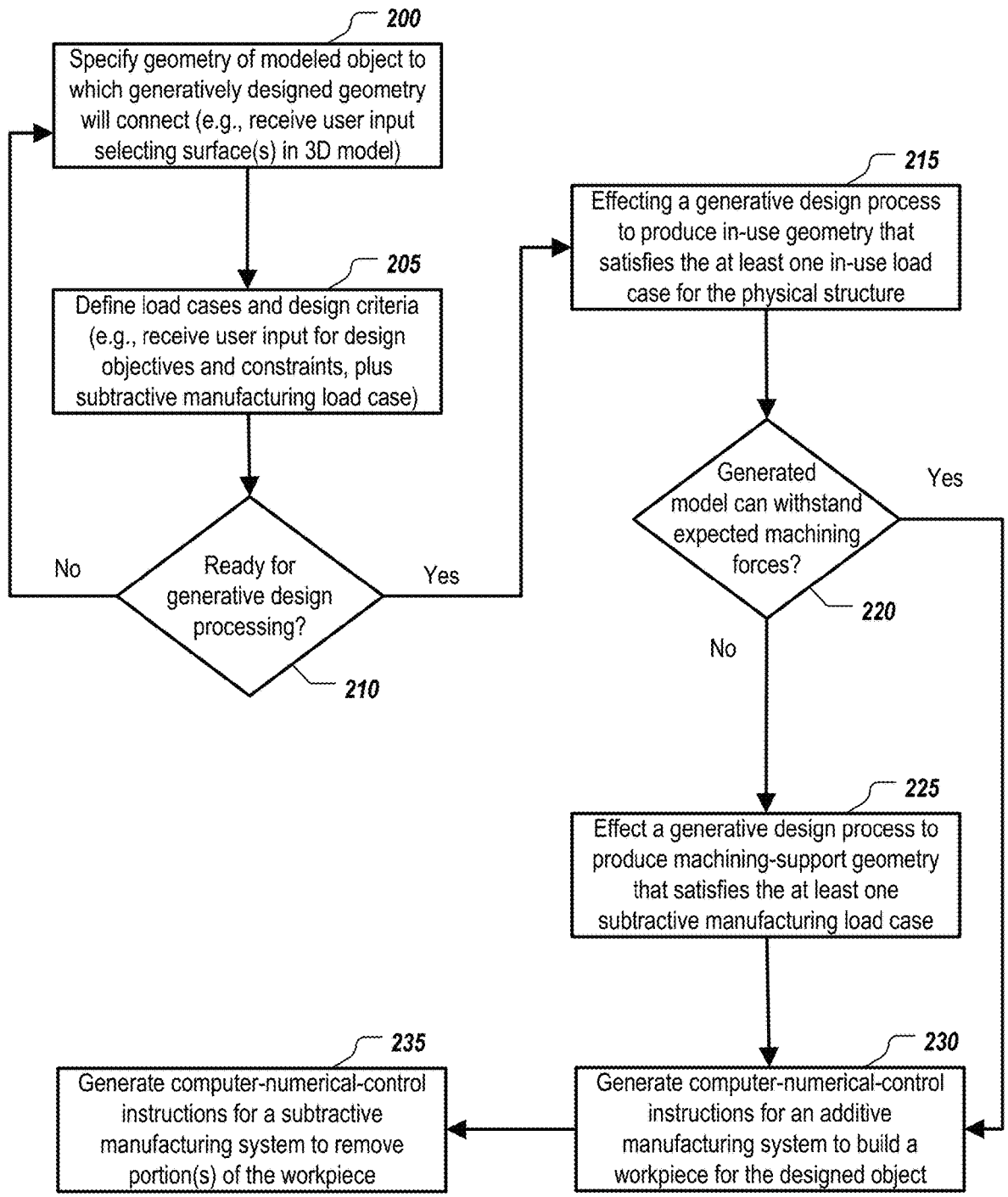
FIG. 2 shows an example of a process to consider subtractive manufacturing forces during generative design of a part.

FIG. 2 shows an example of a process to consider subtractive manufacturing forces during generative design of a part. A design space, load cases, and design criteria are obtained for the modelled object, e.g., by the CAD program(s) 116. This can involve receiving user input, e.g., via UI 122 on display device 120, importing information from another program or a third party source, and/or one or more of these inputs can be predefined in a given implementation. In any case, geometry of a modelled object can be specified 200, e.g., by the CAD program(s) 116, where the specified geometry is a portion of a 3D model to which generatively designed geometry will connect. For example, received input can select one or more surfaces in an existing 3D model to identify the specified geometry with which the generated geometry will interface. The user can also define the design space, or the design space can be derived from the user specified surface(s) of the input geometry and/or other setup parameters of the generative design process.

Moreover, the specified geometry can be composed of two or more separate surfaces that will be used to connect the generatively designed geometry with other parts of a larger system, and machining tolerances can be defined for one or more portions of the 3D model's solids also containing the specified geometry. In some implementations, the user is enabled, e.g., via UI 122 on display device 120, to select multiple parts from an assembly shown in the UI 122, and the user is enabled to indicate loading points and keep away regions for the design. The software, e.g., CAD program(s) 116, can then use the inverse of these as the design space, where the generative design engine is free to create generative geometry to connect the input solid(s) of the 3D model, and the input solid(s) are preserved for use as connection point(s) with other component(s) in a larger 3D model or separate 3D model(s). Thus, the geometry can be specified 200 indirectly by receiving input selecting one or more surfaces on the one or more input solids that are to be avoided by the generative design engine, and so all remaining surfaces of the one or more input solids are then available as connection points for the generatively designed geometry.

Load cases and design criteria for the modelled object can be defined 205, e.g., by the CAD program(s) 116. This can involve receiving user input, e.g., via UI 122 on display device 120, for design objectives and constraints, plus at least one subtractive manufacturing load case in addition to at least one in-use load case for the modelled object. The at least one subtractive manufacturing load case can be associated with the specified geometry and can be directly defined, e.g., a predefined force to be withstood during a drilling operation, or be indirectly defined, e.g., a force to be withstood as a result of simulated machining performed to achieve a design objective or constraint, such as a force resulting from machining operations needed to achieve a specified tolerance value. In some implementations, the machining forces model is defined by user input received in a same manner as user input used to define the in-use forces, e.g., the user 190 selects in UI 122 surface elements of input geometry and/or a design space and then specifies static and/or dynamic loads for in-use operation(s) and for subtractive manufacturing operation(s).

In addition, the at least one subtractive manufacturing load case can be determined based on one or more subtractive manufacturing systems to be used, e.g., CNC mill machining, electrode discharge machining, chemical machining, waterjet machining, etc. In some implementations, the user selects the type of subtractive manufacturing to be performed from options presented by the CAD program(s) 116. In some implementations, the CAD program(s) 116 provide an initial suggestions regarding the type of subtractive manufacturing to be performed, or in a given implementation only one type of subtractive manufacturing may be supported by the CAD program(s) 116. Further details regarding defining at least one subtractive manufacturing load case for use in generative design are provided below.

In any case, suitable user interfaces are presented, e.g., on display device 120, to allow the user to set up the boundary conditions for a generative design process and continue to interact with the UI 122 for the modeled object until the computer model is ready 210 for generative design processing. In some implementations, only one generative design process is made available, e.g., by the CAD program(s) 116; and in some implementations, one or more generative design processes can be selected from a group of available generative design processes, e.g., provided by the CAD program(s) 116. Further, in some implementations, the user is enabled to modify the generative design process(es) by setting appropriate parameters therefor.

In some implementations, the physical simulation performed by the systems and techniques described in this document can simulate one or more physical properties and can use one or more types of simulation. For example, FEA, including linear static FEA, finite difference method(s), and material point method(s) can be used. Further, the simulation of physical properties can include, among other possibilities, simulating buckling, natural frequency, thermal, electric or electro-magnetic flux, and material solidification properties. Note that the setup for physical simulation(s) will be different for different physical simulation(s).

In any case, once the full mechanical problem definition is ready 210 for the model, both in-use and SM load cases will be taken into account for the generatively designed geometry that will be produced for the modelled object in accordance with the load cases for physical simulation of the modelled object and the design criteria for the modeled object. In some implementations, the generative design engine will consider both the in-use load case(s) and the SM load case(s) at the same time, using a force model that includes both during generation of the new geometry for the model. In some implementations, the generative design engine will consider the in-use load case(s) and the SM load case(s) separately during distinct portions of the generative design process, which can result in improved designs.

Thus, producing the generatively designed geometry for the modelled object can include effecting 215 a generative design process to produce in-use geometry that satisfies the at least one in-use load case for the physical structure. The generative design process can employ SIMP and/or level-set method(s) for topology optimization. For example, a generative design engine in the CAD program(s) 116 can employ a level-set method of shape and topology optimization, including potentially using lattices and/or hollows in the generative design, to produce geometry that conforms to requirements of static and/or dynamic loads to be borne when the part is in use, based on physical simulation(s) performed with a first force model of the in-use load(s).

The resulting geometry can thus be optimized for its intended end use. But it may not be able to resist subtractive manufacturing forces. Thus, a check 220 can be made to determine if the model generated initially using in-use load(s) can withstand the expected machining forces of downstream subtractive manufacturing. This can involve physical simulation(s), as described herein. In some implementations, simulation of machining operations is performed to determine the SM forces to be resisted by the initially generated model. In some implementations, the SM forces are determined partially or completely from user input, such as described further below.

If the initial model can withstand the static and/or dynamic loads to be borne when the part is machined, the initial model is provided for use in manufacturing the physical structure for the modeled object. This can include storing or sending the generated model of the object, e.g., by CAD program(s) 116, for later use in creating instructions for manufacture, or this can include generating the instructions, e.g., by CAD program(s) 116, for manufacture, as described further below. If the initial model cannot withstand the static and/or dynamic loads to be borne when the part is machined, the initial model is modified to address the machining loads.

Thus, producing the generatively designed geometry for the modelled object can include effecting 225 a generative design process to produce machining-support geometry that satisfies the at least one subtractive-manufacturing load case. The generative design process can be the same or different than the one used for the in-use load case generative design. For example, the generative design engine in the CAD program(s) 116 can employ the level-set method of shape and topology optimization, including potentially using lattices and/or hollows in the generative design, to produce geometry that conforms to requirements of static and/or dynamic loads to be borne when the part is machined, based on physical simulation(s) performed with a second force model of the machining load(s).

In some implementations, after examining whether the initial geometry can withstand the manufacturing forces, and confirming that the initial geometry isn't strong enough to be manufactured, the initial geometry can serve as the starting point for a second round of topology optimization, with the first force model being replaced with the second force model having the subtractive manufacturing load(s). Thus, the manufacturing focused shape generation can be incremental to the in-service solution previously calculated. In some implementations, the second round of generative design processing can use a force model that combines in-use and subtractive manufacturing loads, in addition to using the in-use geometry from the first round of generative design processing as an initial input geometry to the second round.

Further, note that the check 220 can be partially or fully integrated into the generative design process. For example, the machining force model can be determined 220 based on the initial model produced in a first round 215 of generative design processing, and then this machining force model can replace (or complement) the in-use force model during the second round 225 of generative design processing. During an initial iteration of the generative design processing 225, physical simulation(s) can be performed using the updated force model, and if the initial model already satisfies the machining loads, then the generative design process 225 will end before making any change (or any substantial change) to the initial model.

In any case, machining-support geometry can be produced, as needed, where the machining-support geometry serves to hold the workpiece for the generatively designed part firmly enough to resist the machining forces, when those forces are applied during removal of material from the workpiece to form the final structure. Further, once the design of the object is complete, with machining-support geometry and/or fixturing determined, as described further below, the modeled object with the generatively designed geometry is provided for use in manufacturing the physical structure using first and second stages of manufacturing. In the first stage, a workpiece is built using known systems and techniques. These can include various additive manufacturing, casting and/or forging systems and techniques, such as described above.

In addition, note that the generative design process(es) used can also use one or more additive manufacturing design criteria. For example, an additive manufacturing (AM) constraint (e.g., a minimum self-supporting angle for an AM process) can be used and/or a material property objective (e.g., grain flow for casting or forging) can be used. As will be appreciated, various manufacturing design criteria can be used, which can be loaded from a storage device, received from another process, or defined by a user. Further, when the first stage of the manufacturing process is an AM stage, the AM design criteria can be AM design objectives and/or AM design constraints.

In the second stage, one or more portions of the workpiece are removed using a subtractive manufacturing system, to form the physical structure for the modeled object. As noted above, various subtractive manufacturing systems and techniques can be used, such as CNC mill machining, electrode discharge machining, chemical machining, waterjet machining, etc. Further, in some implementations, control instructions can be generated for one or more of the manufacturing stages.

For example, computer-numerical-control instructions can be generated 230, e.g., by CAD program(s) 116, for an additive manufacturing system to build the workpiece. The additive manufacturing system can be AM machine 170 from FIG. 1. In addition, computer-numerical-control instructions can be generated 235, e.g., by CAD program(s) 116, for a subtractive manufacturing system to remove the one or more portions of the workpiece to form the physical structure. The subtractive manufacturing system can be SM machine 174 from FIG. 1. Further, the instructions provided to SM machine 174 are in accordance with the estimated machining forces that the generatively designed geometry is produced to withstand, e.g., in a specific fixture produced for the design, as described in detail below. Note that a fixture is a work-holding or support device used in the manufacturing industry, where fixtures are used to securely locate (position in a specific location or orientation) and support the work, ensuring that all parts produced using the fixture will maintain conformity and interchangeability.

Figure 3:
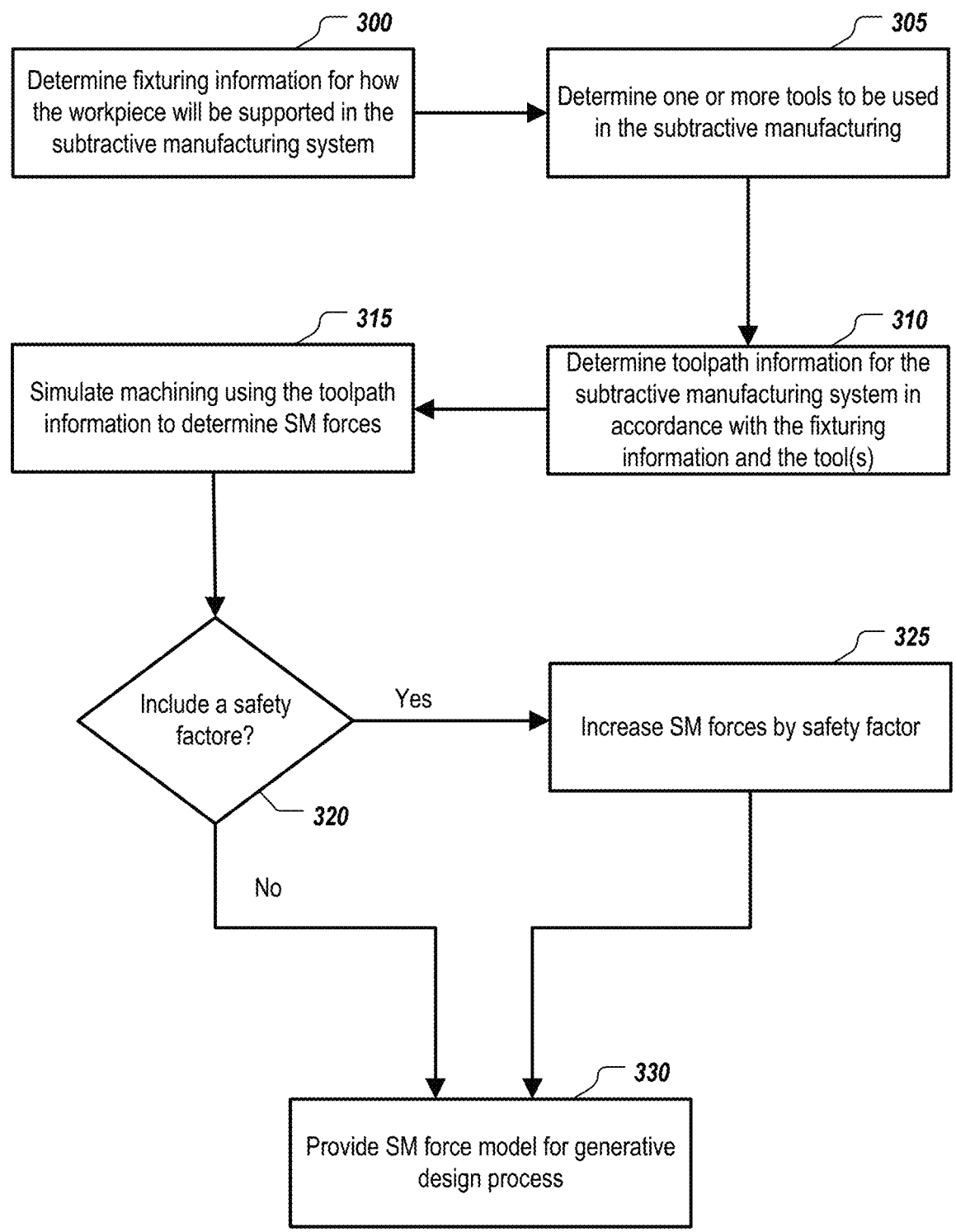
FIG. 3 shows an example of a process to define at least one subtractive manufacturing load case for use in generative design of a part.

FIG. 3 shows an example of a process, e.g., performed by CAD program(s) 116, to define at least one subtractive manufacturing load case for use in generative design of a part. Fixturing information can be determined 300, where the fixturing information indicates how the workpiece for the modeled object will be supported in the SM system during at least a portion of the SM stage of manufacturing. The fixturing information can specify more than one way in which to fixture or clamp the workpiece during different machining operations. The fixturing information can be specified by input received from a user, or the fixturing information can be determined without user input or with the aid of selected user input. In some implementations, the user is enabled through the user interface to indicate how the workpiece is expected to sit on the machine for subtractive manufacturing, the toolpaths are determined based on this indication (automatically or based on user input), the determined toolpaths can be used determine expected machine tool load(s) as well as extra keep out regions for generative design, which can in turn be used to inform the determination of fixtures.

Figure 5A:
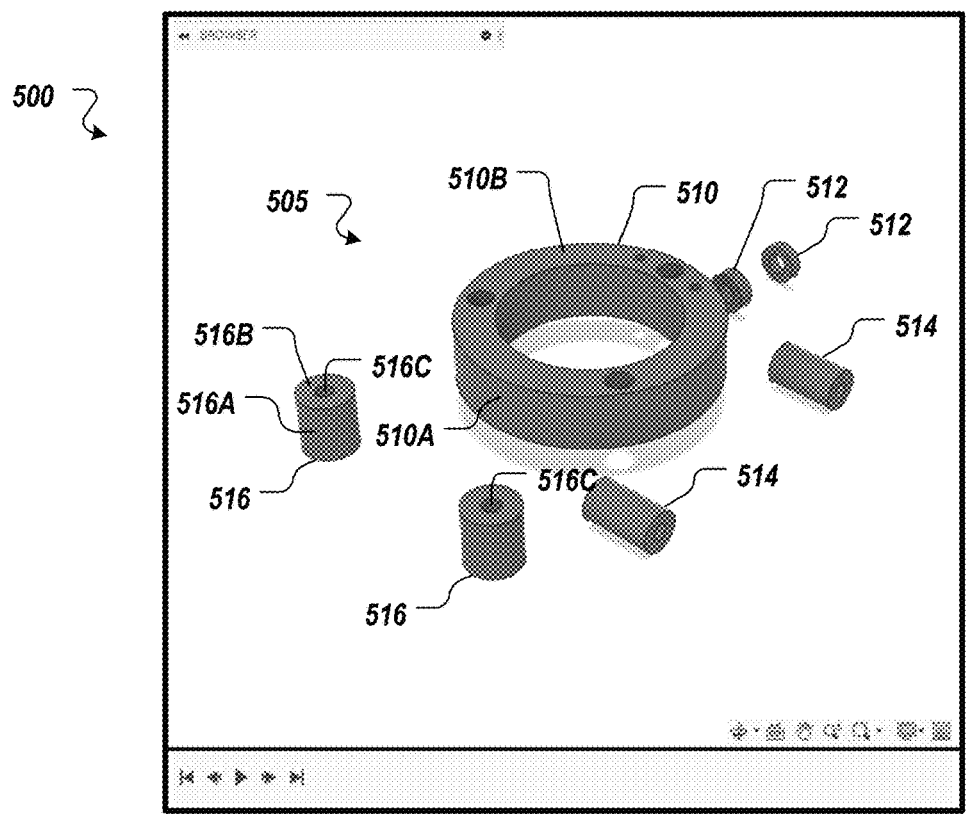
FIG. 5A shows an example of a 3D model with solids to be used as input to a generative design process.

FIG. 5A shows an example of a 3D model 505 with solids 510, 512, 514, 516 to be used as input to a generative design process. A user interface (UI) 500, e.g., part of UI 122, presents the 3D model 505 and allows the user to indicate loading points and keep away regions for the design. In some implementations, the user is enabled by the UI 500 to select various surfaces of the solids 510, 512, 514, 516 where the generatively designed geometry will connect. For example, the user can select a surface 510A of the input solid 510 and a surface 516A of one of the input solids 516 to be locations where the generative design geometry connects. In some implementations, the user is enabled by the UI 500 to select various surfaces of the solids 510, 512, 514, 516 where the generatively designed geometry must be kept away. For example, the user can select a surface 510B of the input solid 510 and a surface 516B of one of the input solids 516 to be locations where the generative design geometry must be kept away. Note that the keep away regions can be defined solely based on user selected surfaces or be defined in part using the machining simulation to determine a clearance region. For example, the user can specify machining tolerance values for particular surfaces of the solids 510, 512, 514, 516, these machining tolerance values can be used to determine tools and toolpaths where CNC machining will be performed, and the determined tools and toolpaths can be used to determine machining keep out regions and machining loads that are included as input to the generative design process.

In some implementations, the user is enabled by the UI 500 to specify static and/or dynamic loads for both in-use operation(s) and for machining operation(s), e.g., by indicating such loads for specific surfaces of the input solids 510, 512, 514, 516. In some implementations, the user specifies in-use load(s), and the program (e.g., CAD program(s) 116) determines the machining load(s) from simulation. For example, the user can specify through UI 500 a fixturing, such as using input solid 510 to hold the workpiece while machining inputs solids 516, and the program can determine toolpaths and machining forces that result from this fixturing, plus any specified tolerance values, surface finishes, etc. that have been specified for various portions of the input solids 510, 512, 514, 516, e.g., a user defined tolerance of 0.1 mm on a faces 516B of a cylinder and a tolerance of 0.01 mm on an inside surface of the hole 516C inside the cylinder.

In some implementations, the program (e.g., CAD program(s) 116) analyzes the input solids 510, 512, 514, 516 and makes recommendations to the user regarding how to do the fixturing during manufacture. For example, the program can suggest using input solid 510 to fixture the workpiece during drilling of holes 516C in input solids 516, and also suggest using these drilled holes 516C in input solids 516 to fixture the workpiece during drilling holes in input solids 510, 512, 514 and/or during finishing operations to meet specified tolerances. As will be appreciated, various fixturing options are possible depending on the particulars of the input solids, the generatively designed geometry, and the capabilities of the subtractive manufacturing system to be used. Further details regarding fixturing are included below.

Returning to FIG. 3, one or more tools are determined 305 for use in the SM operations. The tool(s) to be used can also be specified by input received from a user or be determined without user input or with the aid of selected user input. Toolpath information is then determined 310 for the subtractive manufacturing system in accordance with the fixturing information and the tool(s) to be applied during the SM operation(s). The toolpath information indicates how the workpiece will be machined by the subtractive manufacturing system during the SM stage. The toolpath information can be determined from user input, without user input or with the aid of selected user input. In some implementations, the user specifies the fixturing and the program, e.g., CAD program(s) 116, then determines toolpaths for simulation 315 based on the fixturing. In some implementations, the user specifies the toolpaths and the program, e.g., CAD program(s) 116, then determines fixturing for simulation 315 based on the toolpaths. In some implementations, the user specifies the machining constraints (e.g., tolerance requirements) for the 3D model, and the program, e.g., CAD program(s) 116, determines fixturing and toolpaths from the 3D model and the specified machining constraints.

In some implementations, the design criteria can include one or more subtractive manufacturing objectives and/or constraints that affect the fixturing(s), the tool(s), the toolpath(s), or a combination thereof. For example, a machining tolerance and/or surface finish can be specified for at least a portion of the input solid(s) used for the generative design, and such manufacturing constraints can cause particular tools and forces to be applied to the workpiece to achieve the required machining tolerance and/or surface finish. For example, the specified machining tolerance and/or surface finish can require specific machining operations with tools of different shapes and sizes. The machining operations can include roughing, semi-finishing, and/or finishing operations, and the machining operations can include point and/or flank milling.

The subtractive manufacturing criteria can be loaded from a storage device, received from another process, or obtained as input from a user. In some implementations, the toolpaths and machining forces can be automatically generated through simulation 315 of the SM process. Toolpaths can be generated in accordance with the one or more machining options, including determining one or more feed rates, one or more spindle speeds, and one or more depths of cut for the one or more selected machining tools to be applied in the one or more machining operations, e.g., to achieve the required machining tolerance and/or surface finish.

In some implementations, rather than simulation 315, machining forces are calculated 315 using rules of thumb, data tables of historical data, heuristics or machine learning methods using previously available data gathered during machining. In some implementations, one or more tool(s) can be selected, toolpaths can be generated, and machining the workpiece with the tool(s) and toolpaths can be simulated to determine the machining forces from the simulation. In some implementations, a user can define the toolpaths and the machining forces to be applied to the workpiece, e.g., through the UI 122 for CAD program(s) 116.

In some implementations, a check 320 is made to see if a safety factor is to be included in the machining forces calculation. If so, the SM forces are increased 325 by a safety factor, which can be a percentage increase in the SM forces. In some implementations, more than one safety factor can be employed, and in some implementations, one or more safety factors can be integrated into the simulation(s) 315 to cause the calculated SM forces to already include a specified (e.g., user specified) safety factor. In addition, in some implementations, different approaches and methods can be simulated 315 to generate more than one option for subtractive manufacturing, with different fixturings and toolpaths, different clearance regions and different machining forces. The different clearance regions represent space set aside for tool movements during the subtractive manufacturing, and thus generative design geometry should not be produced in these regions. Note that the size of a clearance region can take account of various aspects of machining toolpaths, such as where to radius, whether to have a sharp edge, and/or other subtractive manufacturing conditions to be satisfied. Further, the different SM options can be compared to select a best option and/or the different SM options can be presented to a user for selection of which to use.

Once the SM force(s), and potentially clearance region(s), are determined, an SM force model is provided 330 for generative design process(es). Note that regardless of how the machining forces are determined, they can be used as a load case for producing generative geometry that serves to support the workpiece when the machining forces are applied to the workpiece by the subtractive manufacturing system during removal of the one or more portions of the workpiece, as well as the in-use forces. In addition, the clearance region(s) can be used to limit the design space for the generative design process(es) thus preventing the production of new geometry that can interfere with later machining operations.

Figure 4:
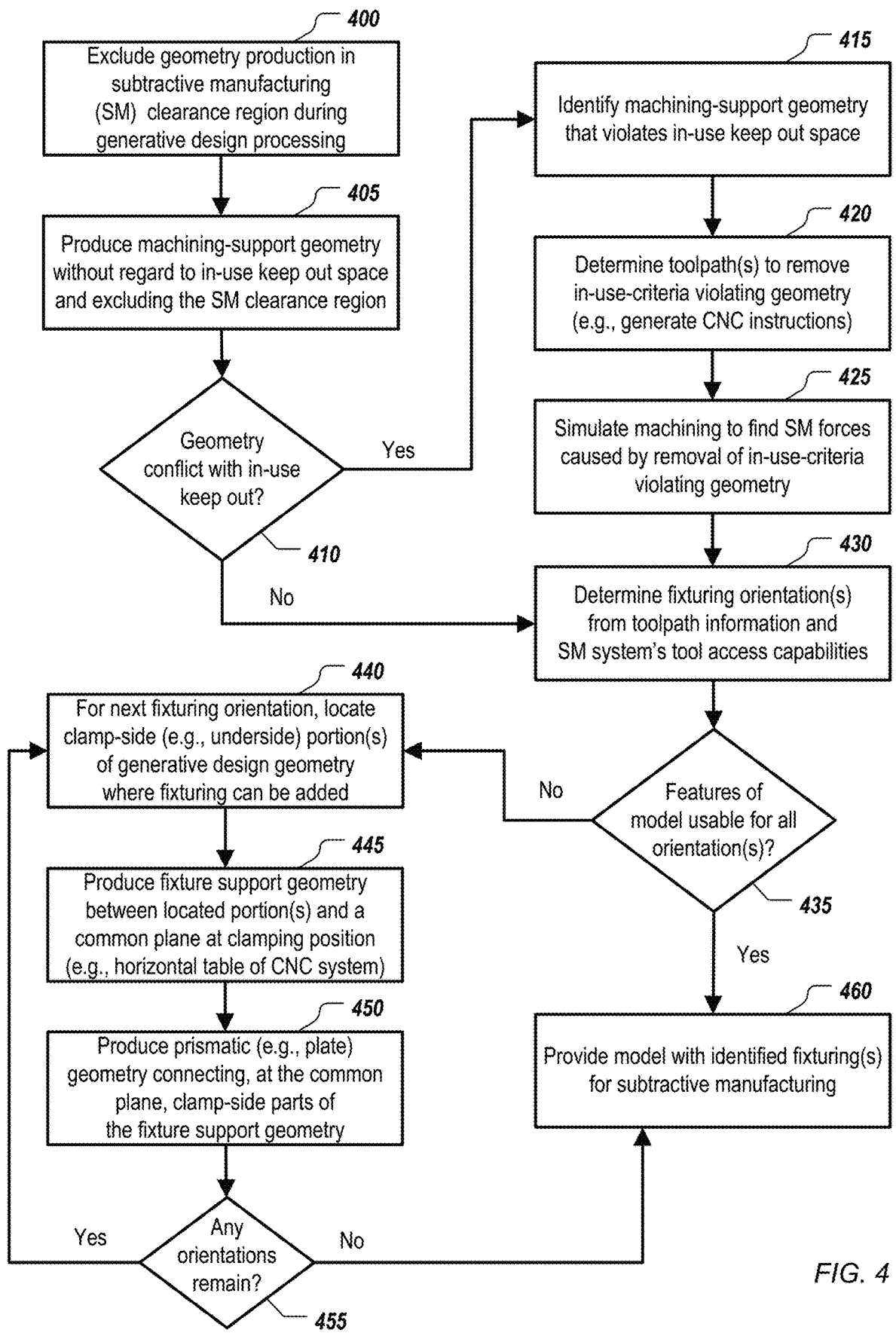
FIG. 4 shows an example of a process to consider subtractive manufacturing forces during generative design of a part and also determine fixturing for the part for use during the subtractive manufacturing stage of physical structure manufacture.

FIG. 4 shows an example of a process, e.g., performed by CAD program(s) 116, to consider subtractive manufacturing forces during generative design of a part and also determine fixturing for the part for use during the subtractive manufacturing stage of physical structure manufacture. Generatively designed geometry is produced in accordance with in-use load(s) while excluding 400 generative geometry from a three dimensional space defined by a subtractive manufacturing clearance region around the one or more tools as used with the one or more toolpaths. This clearance region represents a machining space where tool movements are required for machining the physical structure. For example, a specified tolerance and/or finishing surface for a surface of an input solid can require one or more tool(s) to be used, where the toolpath(s) and tool size(s) create a machining keep out space that is different (e.g., larger) than the in-use keep out space. Thus, this machining keep out space should also be avoided when producing generatively designed geometry. As will be appreciated, the machining space will vary based on the tool(s) selected and the machining operation(s) used, as described above. Thus, for example, the use of flank milling versus point milling will generate different clearance regions even when the tool size is the same.

The generatively designed geometry is further produced in accordance with subtractive-manufacturing load(s) while excluding 405 generation of geometry in the SM clearance region(s). In addition, in some implementations, the production of generatively designed geometry in accordance with the subtractive-manufacturing load(s) also includes producing 405 machining-support geometry without regard to in-use keep out space. For, example, a surface of the specified geometry (e.g., a surface 510B of input solid 510) may be required to connect with another part in a larger system, which thus defines an in-use keep out space about this surface. But while there should be no geometry present in this in-use keep out space during actual use of the part, it may be acceptable to include geometry in this space to serve as extra support during subtractive manufacturing.

Thus, a check 410 can be made for any generated geometry that conflicts with the in-use keep out space. For example, a Boolean compare can be performed between the generated geometry and the in-use keep out space. When there is a conflict, machining-support geometry that violates the in-use keep out space can be identified 415. Further, toolpath(s) can be determined 420 to remove the in-use-criteria violating geometry, and machining simulation 425 can be performed to find SM forces caused by removal of the in-use-criteria violating geometry. Thus, some extra geometry can be created to ensure the workpiece will withstand the subtractive manufacturing forces, and this extra geometry can be removed in a later portion of the subtractive manufacturing process. Moreover, the 3D model can be checked to ensure it can withstand the subtractive manufacturing forces involved in removing the extra geometry. This may in turn require a new approach to fixturing.

Note that determination of toolpaths and fixtures can be performed at different times in the process. In some implementations, the fixturing information is determined from toolpath information, which may be specified by a user or determined by the program without first considering fixturing. Moreover, fixturing can be addressed multiple times in the process to account for changes that occur as a result of the generative design processes, and so fixture determinations can be an iterative process. For example, an initial fixturing can be based on the input solid(s), but the resulting generative design geometry may itself be able to serve as a fixturing location. Thus, once a design is generated, fixturing options can be checked again, and in some cases, the generated geometry may create issues for the initially planned fixturing.

One or more fixturing orientations can be determined 430 from toolpath information and the subtractive manufacturing system's tool access capabilities. Note that different machine tools can have different capabilities with respect to available orientations of the workpiece and control of the tools. For example, the subtractive manufacturing system can include a 2.5-axis CNC machine, a 3-axis CNC machine, or a 5-axis CNC machine. The program, e.g., CAD program(s) 116, can have access to this SM tool access capabilities information and use it to determine how many ways the workpiece has to be positioned in the machine for the subtractive manufacturing stage, potentially based in part on user input.

Figure 5B:
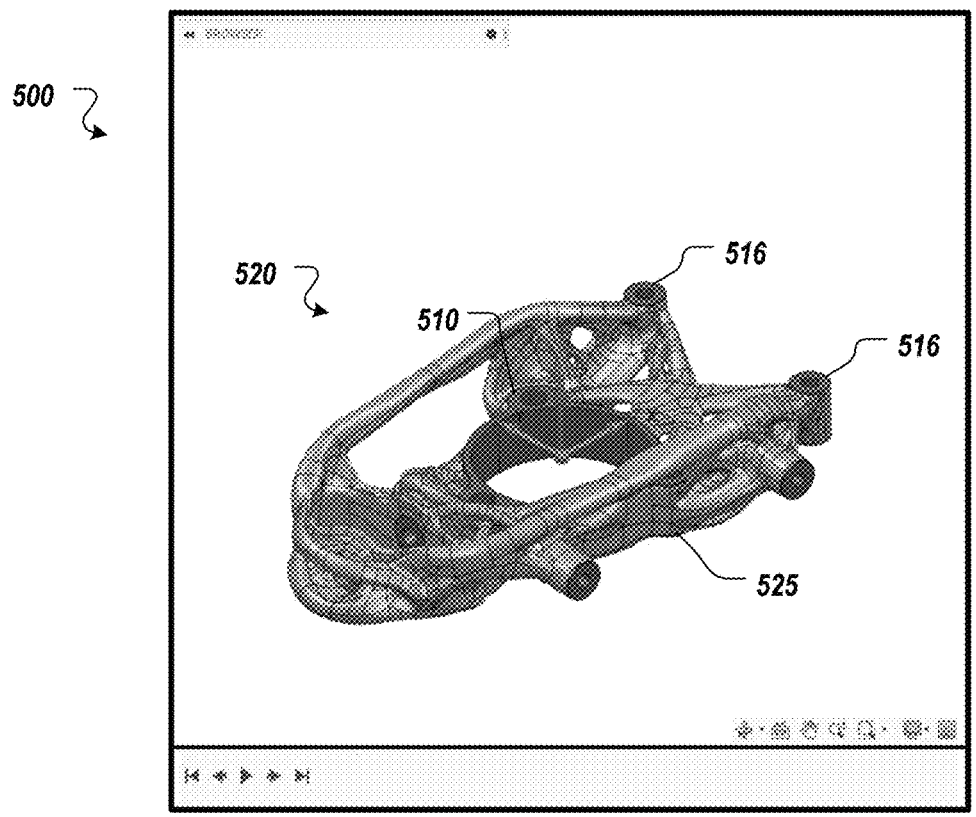
FIG. 5B shows an example of the 3D model of FIG. 5A after generatively designed geometry has been produced.

FIG. 5B shows an example of the 3D model of FIG. 5A after generatively designed geometry has been produced. As shown, the UI 500 presents an updated 3D model 520, which includes the input solids, e.g., input solids 510, 516, and also generatively designed geometry 525. The initial fixturing may suggest building the part in the orientation shown. However, the orthogonal coordinate system implied by this initial fixturing may not allow the workpiece to be clamped to resist machining forces and also still provide the necessary access to the cutting tool.

Returning to FIG. 4, a check 435 can be made to confirm that features of the model are usable for fixturing in all needed orientations. These features can include prismatic surfaces of the input solids or potentially of the generatively designed geometry, and these features can included portions of the workpiece made available after a portion of the subtractive manufacturing, e.g., a hole drilled through the workpiece. If at least one portion of the workpiece will not be accessible for a needed subtractive manufacturing operation, given the features available to serve as fixtures, additional fixture support geometry can be produced. Further, the orientations and positions of the workpiece can be changed, reduced or increased, to provide access to the workpiece by the machining tool(s), and preferably to minimize the number of separate fixturings needed to machine the entire workpiece.

In some implementations, the potential orientations and positions of the workpiece are addressed in sequence so as to create one or more additional fixtures for use during subtractive manufacturing. For example, for a next fixturing orientation, the clamp-side (e.g., underside) portion(s) of the generative design geometry can be located 440. These portion(s) are part(s) of the generative design geometry where fixture support geometry can be added. Then, fixture support geometry can be produced 445 between these located portion(s) and a common plane at a clamping position for the subtractive manufacturing system, such as a horizontal table of a CNC milling machine. Finally, prismatic geometry (e.g., a plate) can be produced 450, where the prismatic geometry connects the clamp-side part(s) of the fixture support geometry at the common plane. Note that the prismatic geometry and its connected fixture support geometry should also be generated taking the machining forces into account to ensure that it will serve effectively as fixture for machining.

A check 455 can be made to see if any more orientations need to be addressed. Note that the check 455 can include confirming a reduction in the number of orientations as the added fixture support geometry can place the workpiece at a new orientation in a position above the clamping position, which can provide access (in a single fixturing) to different parts of the workpiece that previously used more than one fixturing in the subtractive manufacturing stage. In any case, once the fixturing is determined to be sufficient, the model with the identified fixturing(s) is provided 460 for use in subtractive manufacturing. As before, this can include storing or sending the model of the object, e.g., by CAD program(s) 116, for later use in creating instructions for manufacture, or this can include generating the instructions.

Figure 6A:
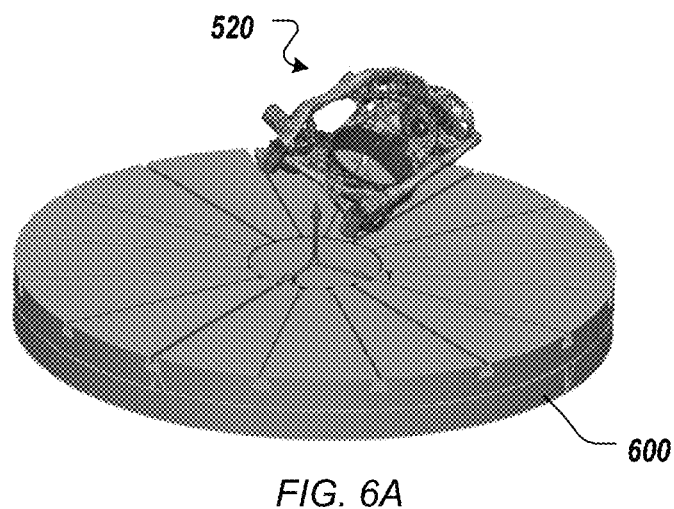
FIGS. 6A-6C show an example of adding additional geometry to the 3D model of FIG. 5A to provide a fixture where the workpiece can be clamped during subtractive manufacturing.
Figure 6B:
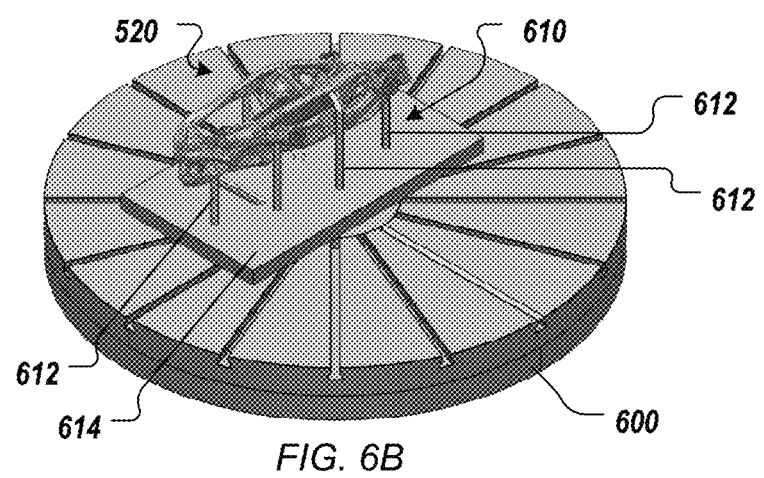
Figure 6C:
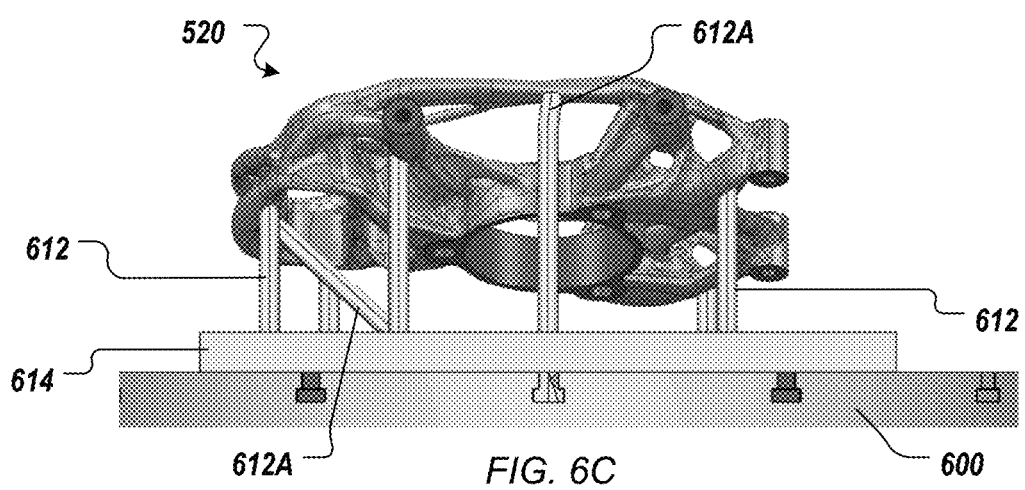

FIGS. 6A-6C show an example of adding additional geometry to the 3D model of FIG. 5A to provide a fixture where the workpiece can be clamped during subtractive manufacturing. As shown in FIG. 6A, the model 520 is transferred to a coordinate system of a machine table 600 for a subtractive manufacturing system. The model 520 can be oriented and positioned in this coordinate system such that the workpiece for the model 520 can be clamped to the machine table 600 in a manner that resists machining forces and still allows access to the one or more cutting tool(s) to be used. To achieve this goal, additional support geometry can be produced from the generatively designed geometry down to a plane that can then be clamped to the machine table 600.

Initially, fixture support geometry can be generated to go from the design space where generatively designed geometry is located to a plane at the surface of the machine table 600. Identifying the locations to which to connect this fixture support geometry can be done by finding the lowest points of the generatively designed geometry and confirming that enough attachment locations (which can be of variable sizes) are available to support the expected subtractive manufacturing forces while also not interfering with the machining space needed for access by the tool(s). FIG. 6B shows the model 520 with an example of fixture support geometry 612 generated therefor.

Each of the supports 612 extend down to a common plane corresponding to the machine table's surface. This common plane can be used to define a plate 614 of additional geometry that connects all the supports 612. As before, the expected subtractive manufacturing forces are taken into account when determining the size of the plate 614. Note that the supports 612 and the plate 614 together form the fixture 610 for use in clamping the workpiece to the machine table 600. Also note that this is but one example, and the support structure in this example has been reduced for clarity.

FIG. 6C shows another view of the model 520 in accordance with the physical workpiece being clamped to the machine table 600 using the plate 614, where the supports 612 hold the portions of the model 520 to be machined well above the machine table 600. Note that all the features of the model 520 to be machined are readily accessible with a 5-axis machine tool using this single fixture 610. Also note that the supports 612 join onto areas of linking material and are spread out across the part, which can facilitate providing a strong fixturing. Further, the supports 612 need not be orthogonal to the part, e.g., non-orthogonal supports 612A, and the supports 612 have been generated to resist the predicted machining forces. Supports 612 can also have compound angles to help resist the machining forces applied in different directions when the different input solids are machined. Finally, the fixture 610 can be removed later on using subtractive manufacturing, such as by using the drilled holes in the workpiece as a fixture to hold the workpiece in a new orientation to expose the fixture 610 for removal.

In some implementations, the supports 612 are generated using generative design process(es) as described above. In some implementations, the part can be iteratively re-designed using one more generative design processes in combination with the simulation of subtractive manufacturing to reduce the cost and time needed to manufacture the part. In some implementations, instructions for removing added fixture material using the subtractive manufacturing machine are also generated.

Figure 7:
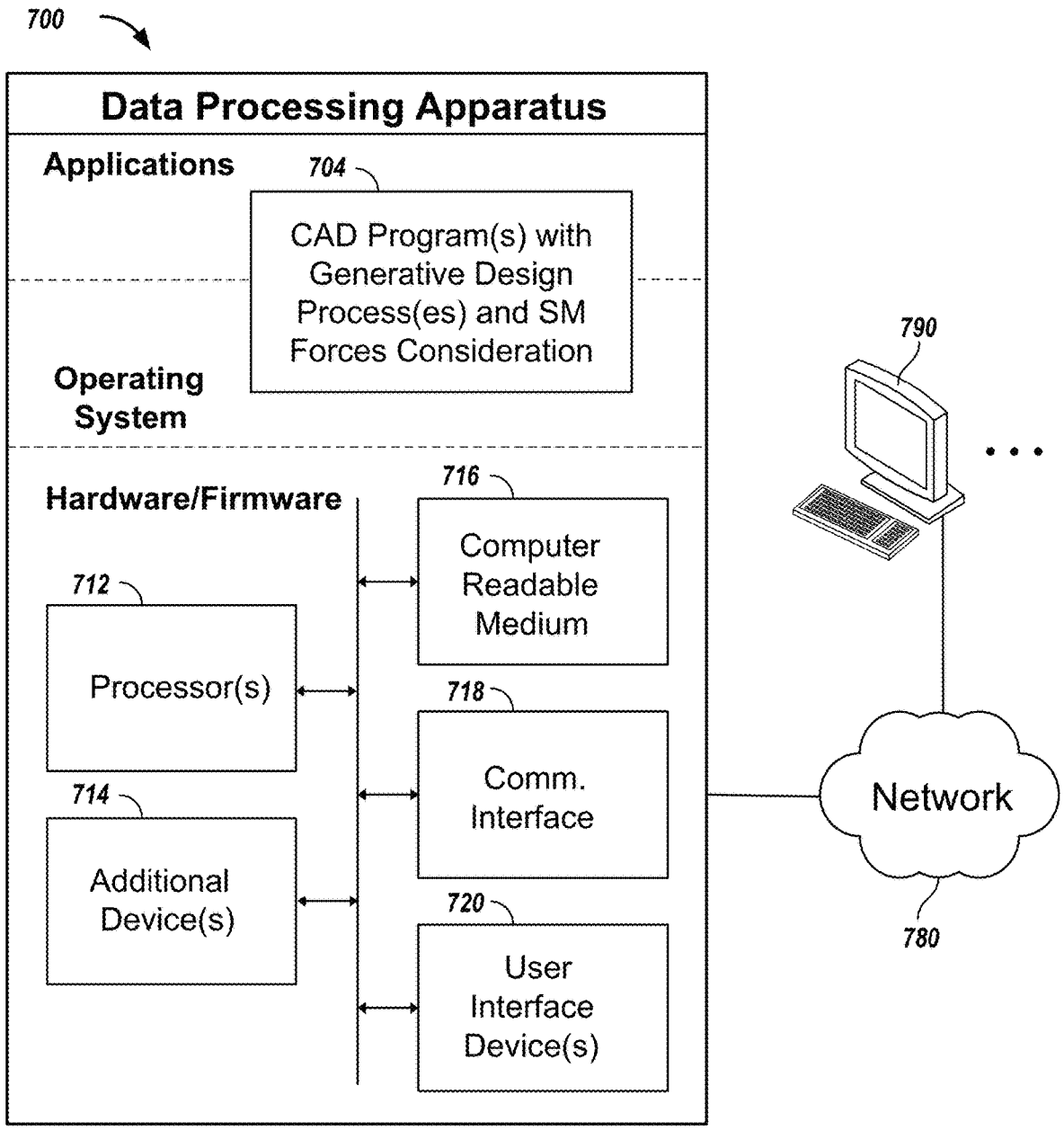
FIG. 7 is a schematic diagram of a data processing system including a data processing apparatus, which can be programmed as a client or as a server.

FIG. 7 is a schematic diagram of a data processing system including a data processing apparatus 700, which can be programmed as a client or as a server. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an applications layer and an operating system. These can include executable and/or interpretable software programs or libraries, including tools and services of one or more 3D modeling programs 704 that implement the systems and techniques described above. Thus, the 3D modeling program(s) 704 can be CAD program(s) 704 that employ one or more generative design processes and take subtractive manufacturing (SM) forces into consideration when producing a generative design. Further, the program(s) 704 can implement physical simulation operations (finite element analysis (FEA) or other), generative design operations (e.g., using level-set based method(s) for generative design), and/or manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining, by a computer program, a design space for a modeled object for which a physical structure will be manufactured using two stages, a design objective for the modeled object, and a force model for physical simulation of the modelled object, wherein the force model defines an in-use load for the physical structure and a subtractive-manufacturing load associated with a subtractive manufacturing system usable to manufacture the physical structure in a second of the two stages;
producing, by the computer program, generatively designed geometry in the design space for the modelled object in accordance with the design objective for the modeled object and with the force model for physical simulation of the modelled object; and
providing, by the computer program, the modeled object with the generatively designed geometry for use in manufacturing the physical structure using a first of the two stages, in which a workpiece is built, and the second of the two stages, in which material of the workpiece is removed using the subtractive manufacturing system, to form the physical structure.

2. The method of claim 1, wherein the producing comprises constraining where the generatively designed geometry is allowed to be created in the design space based on machine tool moves in the subtractive manufacturing system.

3. The method of claim 2, wherein the machine tool moves in the subtractive manufacturing system comprise machine tool moves that effect finishing operations during the second of the two stages.

4. The method of claim 3, wherein the first of the two stages comprises an additive manufacturing stage to build the workpiece, and the second of the two stages employs computer numerical control milling, electrode discharge machining, chemical machining, waterjet machining, or a combination thereof.

5. The method of claim 2, wherein the force model comprises a first force model, which defines the in-use load for the physical structure, and a second force model, which defines the subtractive-manufacturing load associated with the subtractive manufacturing system, and the producing comprises using the first force model and the second force model separately during distinct portions of generative design processing.

6. The method of claim 5, wherein using the first force model and the second force model separately comprises:
performing first physical simulation of the modeled object using the first force model to generate an initial geometry during a first of the distinct portions of the generative design processing; and
performing second physical simulation of the modeled object using the second force model and using the initial geometry as input during a second of the distinct portions of the generative design processing.

7. The method of claim 6, wherein the second force model combines the subtractive-manufacturing load with the in-use load for the physical structure.

8. The method of claim 2, wherein the subtractive-manufacturing load associated with the subtractive manufacturing system is based on fixturing information indicating how the workpiece will be supported in the subtractive manufacturing system during at least a portion of the second of the two stages, the machine tool moves are based on toolpath information indicating how the workpiece will be machined by the subtractive manufacturing system during at least the portion of the second of the two stages, and the method comprises:
  determining the toolpath information based on the fixturing information;
  determining the fixturing information based on the toolpath information; or
  determining the fixturing information and the toolpath information based on the modeled object and specified machining constraints.

9. The method of claim 8, wherein the obtaining comprises receiving input solids for the modelled object, and the method comprises:
  making recommendations to a user regarding how to fixture the workpiece, during at least a portion of the second of the two stages, based on analysis of the input solids; and
  determining the fixturing information based on input received from the user in response to presentation of the recommendations.

10. The method of claim 2, wherein the constraining comprises:
  producing in-use geometry outside of an in-use keep out space and a machining keep out space; and
  producing machining-support geometry outside of the machining keep out space, without regard to the in-use keep out space.

11. The method of claim 10, comprising:
  determining fixturing information for the workpiece, in combination with producing the generatively designed geometry, in an iterative process, wherein determining the fixturing information comprises determining fixturing orientations for the workpiece; and
  producing fixture support geometry when no feature of the modelled object is usable for fixturing the workpiece in at least one of the fixturing orientations.

12. The method of claim 11, comprising producing prismatic geometry that connects with the fixture support geometry.

13. A non-transitory computer-readable medium encoding instructions operable to cause data processing apparatus to perform operations comprising:
  obtaining a design space for a modeled object for which a physical structure will be manufactured using two stages, a design objective for the modeled object, and a force model for physical simulation of the modelled object, wherein the force model defines an in-use load for the physical structure and a subtractive-manufacturing load associated with a subtractive manufacturing system usable to manufacture the physical structure in a second of the two stages;
  producing generatively designed geometry in the design space for the modelled object in accordance with the design objective for the modeled object and with the force model for physical simulation of the modelled object; and
  providing the modeled object with the generatively designed geometry for use in manufacturing the physical structure using a first of the two stages, in which a workpiece is built, and the second of the two stages, in which material of the workpiece is removed using the subtractive manufacturing system, to form the physical structure.

14. The non-transitory computer-readable medium of claim 13, wherein the producing comprises constraining where the generatively designed geometry is allowed to be created in the design space based on machine tool moves in the subtractive manufacturing system.

15. The non-transitory computer-readable medium of claim 14, wherein the machine tool moves in the subtractive manufacturing system comprise machine tool moves that effect finishing operations during the second of the two stages.

16. The non-transitory computer-readable medium of claim 15, wherein the first of the two stages comprises an additive manufacturing stage to build the workpiece, and the second of the two stages employs computer numerical control milling, electrode discharge machining, chemical machining, waterjet machining, or a combination thereof.

17. The non-transitory computer-readable medium of claim 14, wherein the force model comprises a first force model, which defines the in-use load for the physical structure, and a second force model, which defines the subtractive-manufacturing load associated with the subtractive manufacturing system, and the producing comprises using the first force model and the second force model separately during distinct portions of generative design processing.

18. The non-transitory computer-readable medium of claim 17, wherein using the first force model and the second force model separately comprises:
  performing first physical simulation of the modeled object using the first force model to generate an initial geometry during a first of the distinct portions of the generative design processing; and
  performing second physical simulation of the modeled object using the second force model and using the initial geometry as input during a second of the distinct portions of the generative design processing.

19. The non-transitory computer-readable medium of claim 18, wherein the second force model combines the subtractive-manufacturing load with the in-use load for the physical structure.

20. The non-transitory computer-readable medium of claim 14, wherein the subtractive-manufacturing load associated with the subtractive manufacturing system is based on fixturing information indicating how the workpiece will be supported in the subtractive manufacturing system during at least a portion of the second of the two stages, the machine tool moves are based on toolpath information indicating how the workpiece will be machined by the subtractive manufacturing system during at least the portion of the second of the two stages, and the operations comprise:
  determining the toolpath information based on the fixturing information;
  determining the fixturing information based on the toolpath information; or
  determining the fixturing information and the toolpath information based on the modeled object and specified machining constraints.

21. The non-transitory computer-readable medium of claim 20, wherein the obtaining comprises receiving input solids for the modelled object, and the operations comprise:
making recommendations to a user regarding how to fixture the workpiece, during at least a portion of the second of the two stages, based on analysis of the input solids; and
determining the fixturing information based on input received from the user in response to presentation of the recommendations.

22. The non-transitory computer-readable medium of claim 14, wherein the constraining comprises:
producing in-use geometry outside of an in-use keep out space and a machining keep out space; and
producing machining-support geometry outside of the machining keep out space, without regard to the in-use keep out space.

23. The non-transitory computer-readable medium of claim 22, wherein the operations comprise:
determining fixturing information for the workpiece, in combination with producing the generatively designed geometry, in an iterative process, wherein determining the fixturing information comprises determining fixturing orientations for the workpiece; and
producing fixture support geometry when no feature of the modelled object is usable for fixturing the workpiece in at least one of the fixturing orientations.

24. The non-transitory computer-readable medium of claim 23, wherein the operations comprise producing prismatic geometry that connects with the fixture support geometry.

25. A system comprising:
a first computer communicatively coupled with a network; and
a second computer communicatively coupled with the network;
wherein each of the first and second computers comprises a non-transitory computer-readable medium encoding instructions for communicating between the first and second computers, and the non-transitory computer-readable medium of at least one of the first and second computers includes program means for effecting a generative design process that takes into account expected forces of subtractive manufacturing, in addition to a load to be borne by a physical structure during use of the physical structure, when producing a generative design of the physical structure to be manufactured using two stages, at least one of the two stages comprising the subtractive manufacturing.

26. The system of claim 25, wherein the generative design process takes into account tool movements during the subtractive manufacturing, when producing the generative design of the physical structure.

27. The system of claim 26, wherein the tool movements comprise tool movements that effect finishing operations during at least a portion of the subtractive manufacturing.

28. The system of claim 27, wherein a first of the two stages comprises an additive manufacturing stage, and a second of the two stages comprises the subtractive manufacturing, which employs computer numerical control milling, electrode discharge machining, chemical machining, waterjet machining, or a combination thereof.

29. The system of claim 26, wherein the generative design process takes the load to be borne during use and the expected forces of the subtractive manufacturing into account during distinct portions of the generative design process.

30. The system of claim 29, wherein the generative design process performs first physical simulation using a first force model to generate an initial geometry during a first of the distinct portions of the generative design process, and performs second physical simulation using a second force model and using the initial geometry as input during a second of the distinct portions of the generative design process.

31. The system of claim 30, wherein the second force model combines the expected forces of the subtractive manufacturing with the load to be borne by the physical structure during use.

32. The system of claim 26, wherein the expected forces of the subtractive manufacturing take into account fixturing during the subtractive manufacturing, and the program means comprises means for determining the fixturing and the tool movements.

33. The system of claim 32, wherein the program means comprises means for making fixturing recommendations to a user based on input solids.

34. The system of claim 26, wherein the program means comprises means for constraining where generatively designed geometry is allowed to be created, based on an in-use keep out space and a machining keep out space, when producing the generative design of the physical structure.

35. The system of claim 34, wherein the program means comprises means for producing fixturing geometry, including fixture support geometry, based on determined fixturing orientations and features of the physical structure usable for fixturing.

36. The system of claim 35, wherein prismatic geometry that connects with the fixture support geometry is produced.

* * * * *